Figure 1:
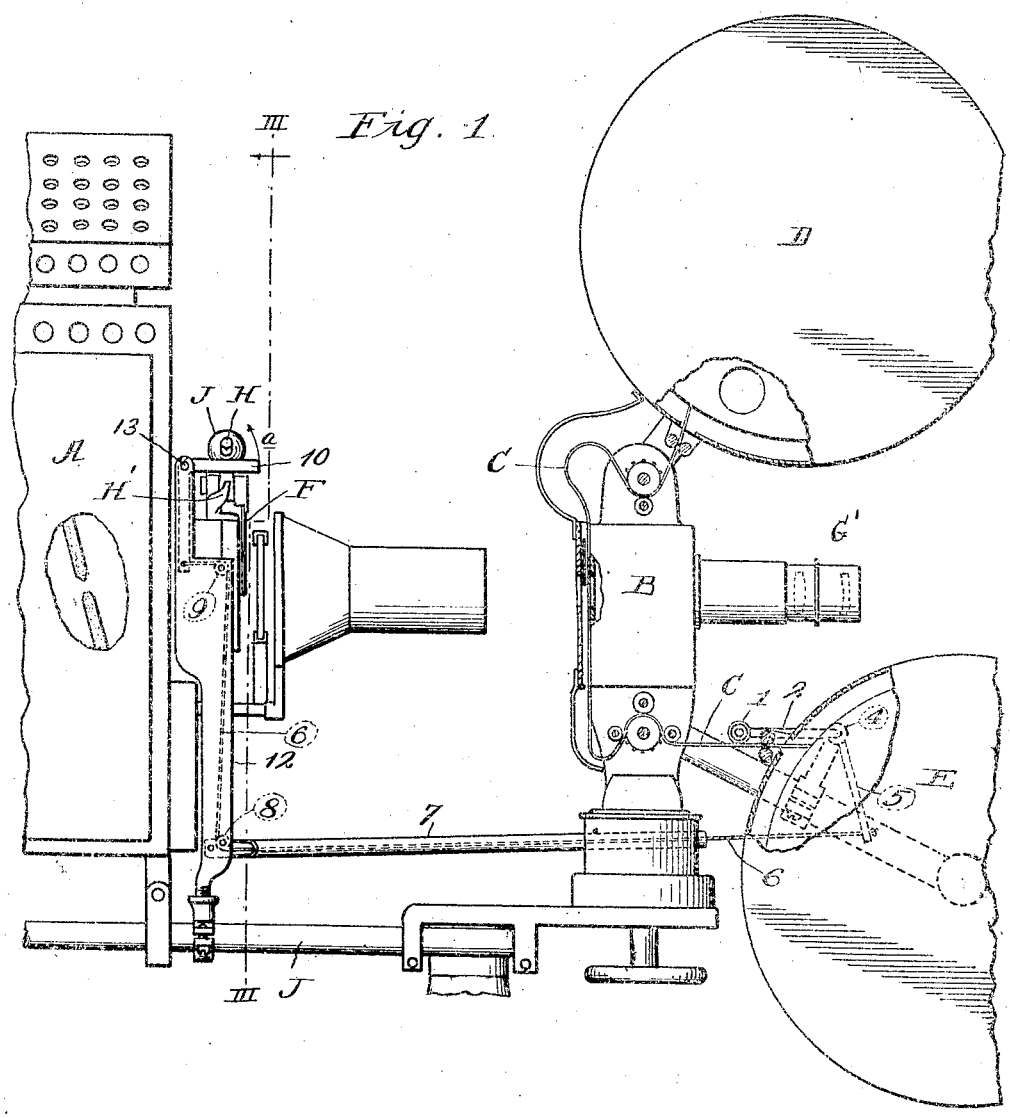

L. E. WYBLE.
SAFETY ATTACHMENT FOR MOVING PICTURE MACHINES.
APPLICATION FILED DEC. 3, 1914.

1,190,354.

Patented July 11, 1916.
2 SHEETS—SHEET 1.

WITNESSES.

INVENTOR:
Lloyd E. Wyble,

BY
ATTORNEY.

L. E. WYBLE.
SAFETY ATTACHMENT FOR MOVING PICTURE MACHINES.
APPLICATION FILED DEC. 3, 1914.
1,190,354.
Patented July 11, 1916.
2 SHEETS—SHEET 2.
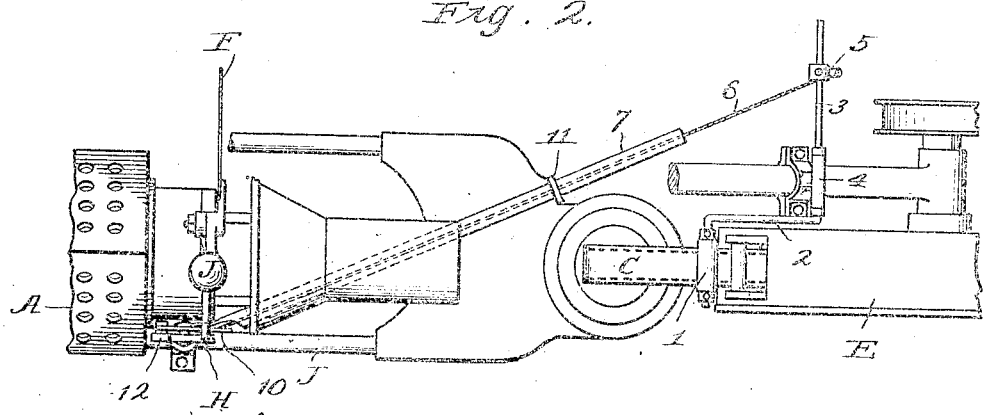
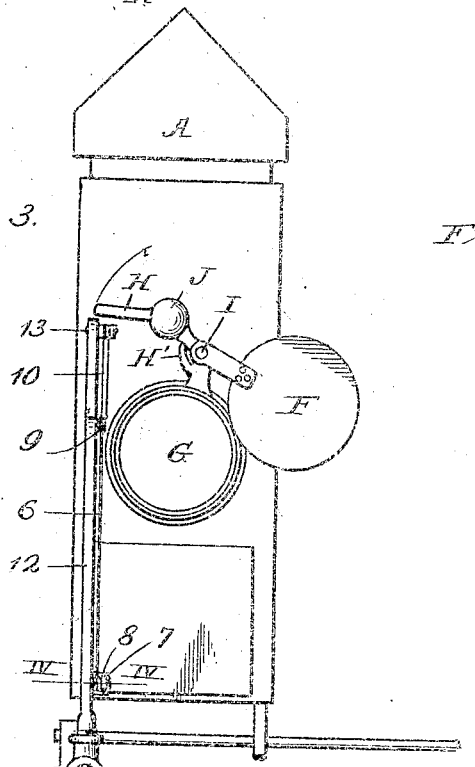
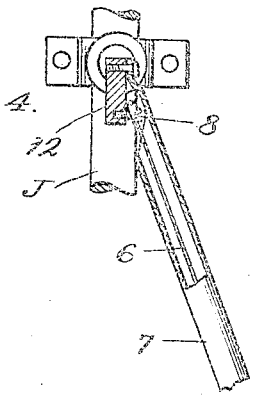
INVENTOR:
Lloyd E. Wyble,
BY
F. G. Fischer
ATTORNEY.

UNITED STATES PATENT OFFICE.

LLOYD E. WYBLE, OF KANSAS CITY, MISSOURI.

SAFETY ATTACHMENT FOR MOVING-PICTURE MACHINES.

1,190,354.

Specification of Letters Patent. Patented July 11, 1916.

Application filed December 3, 1914. Serial No. 875,202.

*To all whom it may concern:*

Be it known that I, LLOYD E. WYBLE, a citizen of the United States, residing at Kansas City, in the county of Jackson and State of Missouri, have invented certain new and useful Improvements in Safety Attachments for Moving-Picture Machines, of which the following is a specification.

My invention relates to a safety attachment for motion picture machines, and it consists of automatic means controlled by the film for shutting off light to said film in case the same should break, or its proper feeding past the objective lens be interrupted, to the end that said film will not be ignited and destroyed by said light.

In order that the invention may be fully understood, reference will now be made to the accompanying drawings, in which:

Figure 1 is a broken side elevation of a motion picture machine provided with my attachment. Fig. 2 is a broken plan view of the same. Fig. 3 is an irregular vertical section on line III—III of Fig. 1. Fig. 4 is a horizontal section, enlarged, on line IV—IV of Fig. 3.

A designates the lamp house, B the objective lens holder, C the film, D the upper film magazine, E the lower or takeup film magazine, and F the Dowser shutter for cutting off the light projected from the lamp house A upon the film C, through the condensing lens G and the objective lens G', of the projecting machine. All of the foregoing parts are of ordinary construction. The shutter F is mounted upon the customary arm H, pivoted at I and carrying a weight J, whereby said shutter is held in either open or closed position.

1 designates a gravity roller supported by the film C at any suitable point between the magazines D and E. Roller 1 is journaled upon the crank arm 2 of a rock shaft 3, mounted in a bearing 4, secured to an adjacent part of the projecting machine.

The rock shaft 3 is provided at a point adjacent its bearing 4 with a depending arm 5, to the lower end of which a cable 6 is attached. Cable 6 extends rearwardly through a tubular guard 7 and thence upwardly around guide sheaves 8 and 9, and is attached at its upper end to a bell-crank lever 10, the horizontal arm of which extends beneath the adjacent terminal of the shutter arm H.

The forward portion of the tubular guard 7 extends freely through a support 11, while its rear end is carried by a bracket 12 adjustably mounted at its lower end upon a rod J, so that it may be adjusted backward and forward with the lamp house A, when the latter is adjusted to bring the lenses into proper focus. However by mounting the bracket 12 upon the rod J, instead of upon the lamp house A, the latter may be shifted to one side for the display of stereopticon views, when automatic control of the shutter F is not required, independently of my mechanism. Hence the latter need not be disconnected or disturbed in any manner, and will always be in position for use.

The guide sheaves 8 and 9 are journaled on stubs carried by the bracket 12, and the bell-crank lever 10 is mounted upon a pivot 13 carried at the upper end of said bracket 12.

During the normal travel of the film C from the magazine D to the magazine E, said film is sufficiently taut to support the roller 1 in normal position, but should the film break or the takeup mechanism fail to properly perform its function and permit the film to pile up between the condenser and objective lenses where it would soon be ignited by the intense light from the lamp house, the roller 1 drops by force of gravity and through the intermediacy of the connecting parts tips the horizontal arm of the bell-crank lever 10 upward, as indicated by the arrow a, Fig. 1, causing it to kick the overhanging end of the arm H upward and close the shutter F; thus cutting off the light and eliminating all danger of igniting the film.

From the foregoing description, it is apparent that I have produced a comparatively simple, inexpensive, and efficient safety device well adapted for the purpose intended, and while I have shown and described the preferred form of my invention, I reserve the right to make such changes in the construction, combination, and arrangement of parts as properly fall within the spirit and scope of the appended claim.

Having thus described my invention, what I claim and desire to secure by Letters Patent, is:

The combination with a film, a lens holder, a projecting machine mounted for adjustment relatively to said lens holder, and a shutter interposed between said projecting machine and the film to cut off the rays of light to the latter, a gravity roller normally controlled by the film, a cable controlled by said gravity roller, a bell-crank lever controlled by said cable and adapted to close the shutter in case of breakage or interrupted feeding of the film, and a bracket mounted independently of the projecting machine and carrying said bell-crank lever, substantially as described.

In testimony whereof I affix my signature in the presence of two witnesses.

LLOYD E. WYBLE.

Witnesses:
F. G. FISCHER,
L. J. FISCHER.